US012723937B2

(12) United States Patent
Miyamoto et al.

(10) Patent No.: US 12,723,937 B2
(45) Date of Patent: Sep. 1, 2026

(54) NON-WETTED PRESSURE MEASUREMENT METHOD, CONTROL METHOD, DEVICE, AND ANALYZER

(71) Applicant: SONY GROUP CORPORATION, Tokyo (JP)

(72) Inventors: Naohide Miyamoto, Tokyo (JP); Kiyomi Seii, Tokyo (JP); Atsushi Nakamura, Tokyo (JP); Eikichi Shibata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 361 days.

(21) Appl. No.: 18/550,977

(22) PCT Filed: Jan. 20, 2022

(86) PCT No.: PCT/JP2022/002028
§ 371 (c)(1),
(2) Date: Sep. 18, 2023

(87) PCT Pub. No.: WO2022/209189
PCT Pub. Date: Oct. 6, 2022

(65) Prior Publication Data
US 2024/0167900 A1 May 23, 2024

(30) Foreign Application Priority Data
Mar. 29, 2021 (JP) ................................ 2021-056021

(51) Int. Cl.
*G01L 9/00* (2006.01)
*G01L 9/12* (2006.01)
(Continued)

(52) U.S. Cl.
CPC ............ *G01L 9/0026* (2013.01); *G01L 19/12* (2013.01); *G01N 15/149* (2024.01); *G01N 2015/1006* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS

| | | | | |
|---|---|---|---|---|
| 6,957,588 | B1 * | 10/2005 | Kicher et al. ......... | G01L 9/0027 73/726 |
| 8,771,228 | B2 * | 7/2014 | Butterfield ........ | A61M 5/14212 417/478 |
| 2014/0219829 | A1 * | 8/2014 | Matsuo et al. ...... | A61M 60/857 417/63 |

FOREIGN PATENT DOCUMENTS

| | | |
|---|---|---|
| JP | S59157537 A | 9/1984 |
| JP | 06-030993 A | 2/1994 |

(Continued)

OTHER PUBLICATIONS

International Search Report and Written Opinion of PCT Application No. PCT/JP2022/002028, issued on Mar. 22, 2022, 09 pages of ISRWO.

*Primary Examiner* — Andre J Allen
(74) *Attorney, Agent, or Firm* — CHIP LAW GROUP

(57) ABSTRACT

Provided is a pressure measurement method including moving a detection unit that detects a force accompanying deformation of a flexible tube by a predetermined distance in a load measurement direction of the flexible tube, measuring a reaction force of the flexible tube by the detection unit, and measuring an internal pressure of the flexible tube on the basis of the reaction force.

12 Claims, 7 Drawing Sheets

(51) Int. Cl.
*G01L 19/12* (2006.01)
*G01N 15/10* (2024.01)
*G01N 15/149* (2024.01)

(58) Field of Classification Search
CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 7/08; G01L 9/0076; G01L 9/0025; G01L 9/0035; G01L 19/0061; G01L 9/0005; G01L 9/0041; G01L 9/0019; G01L 9/08; G01L 9/10; G01L 21/00; G01L 9/04; G01L 11/006; G01L 19/086; G01L 9/00; G01L 9/0008; G01L 1/18; G01L 11/004; G01L 19/069; G01L 9/0057; G01L 19/083; G01L 19/06; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/0003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 5/24; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; G01N 9/002; G01N 9/26; G01N 2291/02872; G01N 3/12; G01N 11/08; G01N 7/14; G01N 21/39; G01N 33/24; G01N 7/00; G01N 17/04; G01N 21/15; G01N 13/00; G01N 27/18; G01N 3/08; G01N 21/3504; G01N 2203/0676; G01N 2291/02836; G01N 25/18; G01N 27/223; G01N 33/2823; G01N 9/00; G01N 15/0826; G01N 29/024; G01N 30/32;

G01N 33/2888; G01N 7/10; G01N 13/04; G01N 2009/006; G01N 3/06; G01N 33/18; G01N 7/04; G01N 9/28; G01N 15/0806; G01N 2291/0256; G01N 2291/02881; G01N 2291/0427; G01N 2291/2695; G01N 27/226; G01N 29/022; G01N 29/14; G01N 2030/326; G01N 2035/1018; G01N 2291/0423; G01N 29/036; G01N 3/064; G01N 3/307; G01N 30/6095; G01N 35/1016; G01N 9/18; G01N 1/2035; G01N 2021/6484; G01N 21/37; G01N 21/45; G01N 2291/011; G01N 2291/0255; G01N 2291/044; G01N 29/12; G01N 29/222; G01N 1/10; G01N 1/14; G01N 11/06; G01N 11/16; G01N 15/0656; G01N 15/082; G01N 15/12; G01N 2021/054; G01N 2035/009; G01N 21/69; G01N 2203/0044; G01N 2291/02818; G01N 25/14; G01N 25/50; G01N 27/24; G01N 29/02; G01N 29/2412; G01N 3/30; G01N 3/36; G01N 30/36; G01N 33/0036; G01N 33/246; G01N 33/2858; G01N 9/266; G01N 1/02; G01N 1/125; G01N 1/2226; G01N 1/44; G01N 11/02; G01N 15/1456; G01N 2001/2229; G01N 2021/0314; G01N 2021/6432; G01N 2021/7786; G01N 2035/00524; G01N 21/0303; G01N 21/53; G01N 21/77; G01N 21/85; G01N 21/8507; G01N 2201/08; G01N 2203/0075; G01N 2203/0085; G01N 2203/0222; G01N 2291/2626; G01N 2291/2634; G01N 27/12; G01N 27/4062; G01N 29/043; G01N 29/245; G01N 29/2481; G01N 29/28; G01N 31/22; G01N 33/00; G01N 33/205; G01N 33/383; G01N 33/442; G01N 35/0098; G01N 35/025; G01N 35/1079; G01N 1/18; G01N 1/2042; G01N 1/30; G01N 11/14; G01N 11/162; G01N 13/02; G01N 15/00; G01N 15/02; G01N 15/042; G01N 15/08; G01N 15/14; G01N 17/043; G01N 2001/007; G01N 2001/1093; G01N 2001/205; G01N 2001/2071; G01N 2009/004; G01N 2009/028; G01N 2009/263; G01N 2011/0086; G01N 2013/006; G01N 2015/045; G01N 2015/0846; G01N 2015/145; G01N 2015/1493; G01N 2021/215; G01N 2021/3513; G01N 2021/6434; G01N 2021/772; G01N 2021/7773; G01N 2021/7776; G01N 2021/7779; G01N 2030/328; G01N 2030/347; G01N 2030/889; G01N 2035/00237; G01N 2035/00277; G01N 2035/00326; G01N 2035/0491; G01N 2035/1025; G01N 2035/1034; G01N 21/05; G01N 21/1702; G01N 21/23; G01N 21/274; G01N 21/314; G01N 21/35; G01N 21/43; G01N 21/431; G01N 21/51; G01N 21/552; G01N 21/6447; G01N 21/645; G01N 21/718; G01N 21/72; G01N 21/73; G01N 21/7703; G01N 21/783; G01N 21/79; G01N 2201/0622; G01N 2201/088; G01N 2203/00; G01N 2203/0007; G01N 2203/0039; G01N 2203/0076; G01N 2203/0091; G01N 2203/021; G01N 2203/0226; G01N 2203/0232; G01N 2203/0246; G01N 2203/0254; G01N 2203/0268; G01N 2203/028; G01N 2203/0284; G01N 2203/0286; G01N 2203/0288; G01N 2291/0215; G01N 2291/022; G01N 2291/0231; G01N 2291/0234; G01N 2291/024; G01N 2291/02827; G01N 2291/02863; G01N 2291/101; G01N 2291/2694; G01N 2291/2697; G01N 25/00; G01N 25/02; G01N 25/28; G01N 25/32; G01N 25/60; G01N 25/62; G01N 25/68; G01N 27/00; G01N 27/025; G01N 27/20; G01N 27/22; G01N 27/221; G01N 27/225; G01N 27/227; G01N 27/228; G01N 27/40; G01N 27/4077; G01N 27/4165; G01N 27/62; G01N 27/70; G01N 27/72; G01N 27/725; G01N 27/92; G01N 29/041; G01N 29/11; G01N 29/227; G01N 29/2406; G01N 29/2462; G01N 29/2475; G01N 29/2493; G01N 29/265; G01N 29/32; G01N 29/326; G01N 29/34; G01N 29/36; G01N 29/4427; G01N 29/46; G01N 3/00; G01N 3/18; G01N 3/20; G01N 3/24; G01N 3/32; G01N 3/40; G01N 3/42; G01N 30/20; G01N 30/24; G01N 30/34; G01N 30/6047; G01N 30/8658; G01N 30/88; G01N 33/0016; G01N 33/0081; G01N 33/0098; G01N 33/143; G01N 33/26; G01N 33/28; G01N 33/30; G01N 33/32; G01N 33/365; G01N 33/38; G01N 33/388; G01N 33/42; G01N 33/487; G01N 35/1002; G01N 35/1009; G01N 35/1011; G01N 35/1097; G01N 37/00; G01N 5/02; G01N 7/02; G01N 7/12; G01N 9/02; G01N 9/06; G01N 9/08; G01N 9/12; G01N 9/20; G01N 9/32; G01N 1/20; G01N 1/28; G01N 1/38; G01N 1/4005; G01N 15/0205; G01N 15/0618; G01N 15/131; G01N 17/00; G01N 17/006; G01N 19/02; G01N 2001/386; G01N 2011/0046; G01N 2011/147; G01N 2015/084; G01N 2021/1793; G01N 2030/621; G01N 21/0317; G01N 21/25; G01N 21/31; G01N 21/636; G01N 21/64; G01N 21/6408; G01N 21/643; G01N 21/6486; G01N 21/6489; G01N 2203/0048; G01N 2203/04; G01N 2203/0641; G01N 2291/0232; G01N 2291/0258; G01N 2291/048; G01N 2291/102; G01N 2333/745; G01N 2405/04; G01N 25/56; G01N 27/002; G01N 27/048; G01N 27/128; G01N 27/407; G01N 27/4141; G01N 27/902; G01N 29/045; G01N 29/07; G01N 29/341; G01N 29/343; G01N 29/38; G01N 3/48; G01N 30/02; G01N 30/7233; G01N 33/0003; G01N 33/0009; G01N 33/008; G01N 33/49; G01N 33/54373; G01N 33/57434; G01N 33/6848; G01N 35/00623; G01N 9/24

USPC .................................................. 73/700–756
See application file for complete search history.

(56) References Cited

FOREIGN PATENT DOCUMENTS

| | | | | | |
|---|---|---|---|---|---|
| JP | 2003-014571 | A | | 1/2003 | |
| JP | 2010-271168 | A | | 12/2010 | |
| JP | 2017012269 | A | * | 1/2017 | |
| JP | 2019-052936 | A | | 4/2019 | |
| JP | 2021105625 | A | * | 7/2021 | |
| KR | 10-1597653 | B1 | | 2/2016 | |
| WO | 2018/151084 | A1 | | 8/2018 | |
| WO | WO-2024053631 | A1 | * | 3/2024 | .......... A61M 1/3666 |

* cited by examiner

NON-WETTED PRESSURE MEASUREMENT METHOD, CONTROL METHOD, DEVICE, AND ANALYZER

CROSS REFERENCE TO RELATED APPLICATIONS

This application is a U.S. National Phase of International Patent Application No. PCT/JP2022/002028 filed on Jan. 20, 2022, which claims priority benefit of Japanese Patent Application No. JP 2021-056021 filed in the Japan Patent Office on Mar. 29, 2021. Each of the above-referenced applications is hereby incorporated herein by reference in its entirety.

TECHNICAL FIELD

The present technology relates to a pressure measurement method, a control method, a pressure measurement device, and an analyzer. More specifically, the present technology relates to a pressure measurement method, a control method, a pressure measurement device, and an analyzer capable of accurately measuring pressure from the outside of a tube in a non-wetted manner.

BACKGROUND ART

Currently, a technology referred to as flow cytometry is used for analyzing particles such as cells and microorganisms. This flow cytometry is a method for analyzing and sorting particles by irradiating the particles flowing so as to be included in a sheath flow with light and detecting fluorescence and scattered light emitted from each particle.

Here, in a device used for analyzing particles such as cells and microorganisms, for example, in a case where the particles are used for treatment or the like, for the purpose of preventing contamination or the like, it is required that the inside of a flow path through which the particles and other liquid medicine flow is sterilized, and the flow path structure can be replaced after one use. Furthermore, since the device is a mechanism for flowing a fluid, from the viewpoint of safety and control, it is often necessary to monitor a pressure state inside a member forming the flow path structure. Furthermore, although it is possible to measure the pressure by making some members disposable, there is a problem that the flow path structure becomes expensive by making the members disposable.

Therefore, there is a demand for a technology that does not require a dedicated member for pressure measurement and enables pressure measurement inside a flexible tube forming a flow path structure from the outside of the tube in a non-wetted manner.

Against this background, for example, Patent Document 1 discloses "An occlusion detection device for an infusion pump that is incorporated in an infusion pump including a pump unit configured to move liquid passing through a flexible tube while sequentially pressing the tube, and detects occlusion of the tube on a downstream side of the pump unit, the occlusion detection device comprising: an expansion detection unit that detects expansion of the tube accompanying an increase in tube internal pressure due to the occlusion; a temperature detection unit that detects a use environment temperature of the infusion pump; and a control unit that changes an occlusion detection level on the basis of the use environment temperature detected by the temperature detection unit, and determines the occlusion of the tube by comparing the occlusion detection level with the expansion of the tube detected by the expansion detection unit".

CITATION LIST

Patent Document

Patent Document 1: Japanese Patent Application Laid-Open No. H06-30993

SUMMARY OF THE INVENTION

Problems to be Solved by the Invention

As described above, a technology capable of measuring pressure inside a flexible tube in a non-wetted manner from the outside of the tube is a method that has been used, but in a case where the required accuracy of the pressure measurement is high, it is difficult to accurately perform the pressure measurement by the conventional method due to the influence caused by the physical properties of the flexible tube to be measured.

Therefore, a main object of the present technology is to provide a technology capable of accurately measuring pressure from the outside of a tube in a non-wetted manner.

Solutions to Problems

The present technology first provides a pressure measurement method at least including: a moving step of moving a detection unit that detects a force accompanying deformation of a flexible tube by a predetermined distance in a load measurement direction of the tube; a reaction force measurement step of measuring a reaction force of the tube by the detection unit; and a measurement step of measuring an internal pressure of the tube on the basis of the reaction force in the reaction force measurement step.

Furthermore, the present technology also provides a device control method at least including: a moving step of moving a detection unit that detects a force accompanying deformation of a flexible tube by a predetermined distance in a load measurement direction of the tube; a reaction force measurement step of measuring a reaction force of the tube by the detection unit; a measurement step of measuring an internal pressure of the tube on the basis of the reaction force in the reaction force measurement step; and a determination step of determining whether or not the internal pressure in the measurement step has exceeded a threshold, in which, in the determination step, a predetermined operation in the device is stopped and/or a warning is issued when the internal pressure in the measurement step has exceeded the threshold.

Moreover, the present technology also provides a pressure measurement device at least including a detection unit that detects a force accompanying deformation of a flexible tube, and a moving unit that moves the detection unit by a predetermined distance in a load measurement direction of the tube, in which the detection unit measures a reaction force of the tube, and measures an internal pressure of the tube on the basis of the reaction force.

In addition, the present technology also provides an analyzer at least including an analysis unit that has a flexible tube through which a liquid flows, and a pressure measurement unit that includes a detection unit for detecting a force accompanying deformation of the flexible tube, and a moving unit for moving the detection unit by a predetermined distance in a load measurement direction of the tube, in which the pressure measurement unit measures a reaction force of the tube by the detection unit, and measures an internal pressure of the tube on the basis of the reaction force.

MODE FOR CARRYING OUT THE INVENTION

Figure 1:
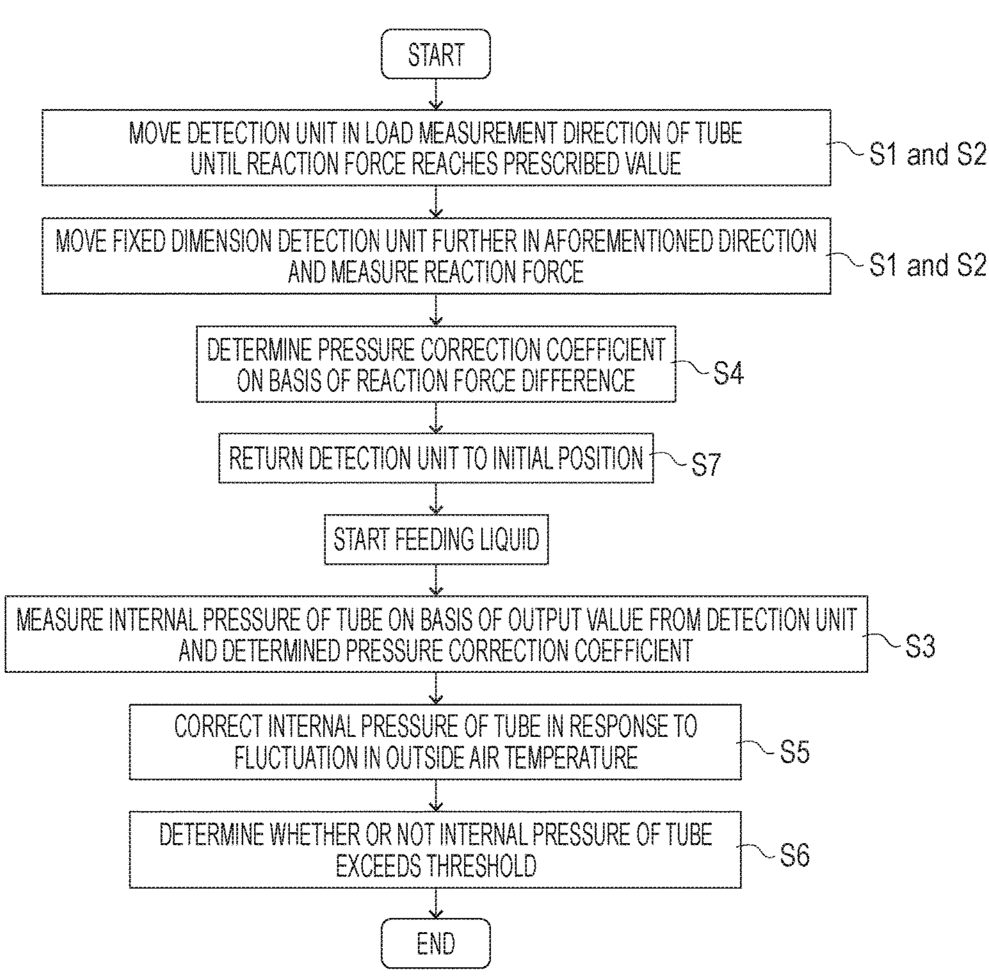
FIG. 1 is a diagram illustrating an example of a flow of a pressure measurement method according to the present technology.

A preferred embodiment for implementing the present technology will be described below with reference to the drawings.

An embodiment hereinafter described illustrates an example of a representative embodiment of the present technology, and the scope of the present technology is not narrowed by this. Note that the description will be given in the following order.

1. First embodiment (pressure measurement method)
(1) Moving step S1
(2) Reaction force measurement step S2
(3) Measurement step S3
(4) Correction coefficient determination step S4
(5) Correction step S5
(6) Determination step S6
(7) Other steps
2. Second embodiment (control method)
(1) Modification of determination step S6
(2) Control step S8
3. Third embodiment (pressure measurement device 10)
(1) Detection unit 11
(2) Moving unit 12
(3) Others
4. Fourth embodiment (analyzer 100)
(1) Analysis unit 101
(1-1) Analysis kit 1011
(1-2) Case of sorting target particles using analysis kit 1011
(1-3) Others
(2) Pressure measurement unit 102
(3) Processing unit 103
(4) Determination unit 104
(5) Warning unit 105
(6) Light irradiation unit 106
(7) Light detection unit 107
(8) Storage unit 108
(9) Display unit 109
(10) User interface 110

1. First Embodiment (Pressure Measurement Method)

FIG. 1 is a diagram illustrating an example of a flow of a pressure measurement method according to the present technology.

The pressure measurement method according to the present embodiment performs at least a moving step S1, a reaction force measurement step S2, and a measurement step S3. Furthermore, a correction coefficient determination step S4, a correction step S5, a determination step S6, other steps, and the like may be performed as necessary. Hereinafter, each step will be described in detail.

(1) Moving Step S1

The moving step S1 is a step of quantitatively moving a detection unit 11 that detects a force accompanying deformation of a flexible tube F by a predetermined distance in a load measurement direction of the tube F.

In the present embodiment, the material forming the flexible tube F is not particularly limited, and examples thereof include fluororesin, silicon, vinyl chloride, polyurethane, polyolefin such as polypropylene and polyethylene, or a combination thereof. Furthermore, the hardness, inner and outer diameters, and the like of the tube are also not particularly limited.

The detection unit 11 is not particularly limited as long as it can detect force accompanying deformation of the flexible tube F. Specific examples of the detection unit 11 include a force sensor. Examples of the type of the force sensor include a sensor using a link mechanism, a strain cage sensor, a piezoelectric sensor, an optical sensor, a capacitive sensor, or a combination thereof.

Note that the "deformation of the flexible tube" in the present technology is a broad concept including deformation due to application of an external force to the flexible tube F, swelling or contraction of the flexible tube F itself due to fluctuation in the internal pressure of the tube F, and the like. Furthermore, the "force accompanying deformation of the flexible tube" may include a reaction force generated by applying an external force to the flexible tube F, a force generated in the radial direction when the flexible tube F itself swells or contracts due to fluctuation in the internal pressure of the tube F, and the like.

In the present embodiment, the detection unit 11 can measure, as a force, a reaction force generated by applying an external force to the flexible tube F or swelling or contraction of the flexible tube F itself due to fluctuation in the internal pressure of the tube F.

In the present embodiment, the "load measurement direction" is specifically a direction in which the tube F comes into contact. The method for moving the detection unit 11 by a predetermined distance in the load measurement direction is not particularly limited, and for example, by providing a feed mechanism or the like, the detection unit 11 can be moved by a predetermined distance in the aforementioned direction.

Note that the "predetermined distance" mentioned herein can be appropriately set by those skilled in the art. In the present embodiment, for example, the predetermined distance can be set within a range of 0.1 cm to 1.0 cm.

In the present embodiment, the moving step S1 and the reaction force measurement step S2 described later may be performed simultaneously as illustrated in FIG. 1. Furthermore, the moving step S1 may be performed a plurality of times. This will be described in detail in "(2) Reaction force measurement step S2" described later.

(2) Reaction Force Measurement Step S2

The reaction force measurement step S2 is a step of measuring the reaction force of the tube F by the detection unit 11.

In the present embodiment, specifically, the "reaction force" is a force generated by bringing the detection unit 11 into contact with the tube F to apply an external force, the reaction force occurring in a direction opposite to the external force.

As described above, in the present embodiment, the moving step S1 and the reaction force measurement step S2 may be performed simultaneously. For example, by performing the reaction force measurement step S2 while performing the moving step S1, the reaction force accompanying the gradual deformation of the flexible tube F can be measured over time. More specifically, for example, in the moving step S1, the detection unit 11 can be moved in the aforementioned direction until the reaction force in the reaction force measurement step S2 reaches a prescribed value.

Note that the "prescribed value" mentioned herein can be appropriately set by those skilled in the art.

Furthermore, as described above, the moving step S1 may be performed a plurality of times. Specifically, for example, in the moving step S1, after the detection unit 11 is moved in the aforementioned direction until the reaction force in the reaction force measurement step S2 reaches a prescribed value, the detection unit 11 can be further moved by a predetermined distance in the aforementioned direction. Furthermore, in a case where the moving step S1 is performed a plurality of times, the prescribed value may also include "0".

In this case, the reaction force measurement step S2 may also be performed a plurality of times. As a result, for example, a person skilled in the art can appropriately select two reaction forces from reaction forces obtained in the reaction force measurement step S2 performed a plurality of times, and use the difference between the two reaction forces as a parameter related to the physical properties of the tube F.

FIGS. 2A, 2B, 2C, and 2D are diagrams for describing in detail a method of obtaining a reaction force difference.

Figures 2A, 2B, 2C, 2D:
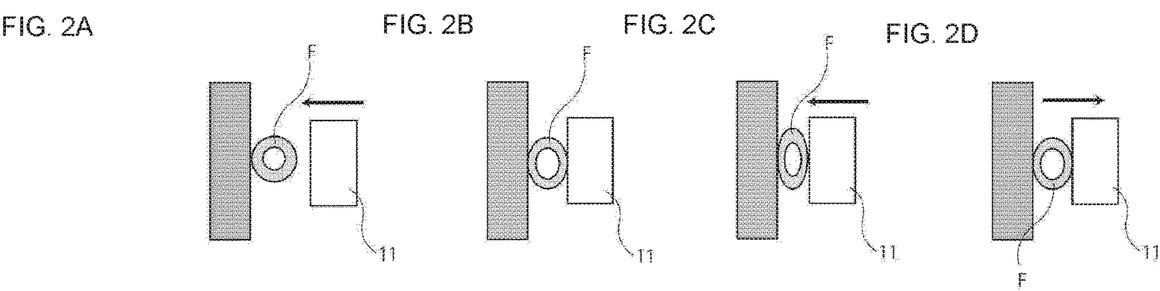
FIGS. 2A, 2B, 2C, and 2D are diagrams for describing in detail a method of obtaining a reaction force difference.

First, as illustrated in FIG. 2A, the detection unit 11 is moved by a predetermined distance in the load measurement direction of the tube F in the moving step S1. Next, as illustrated in FIG. 2B, when it is confirmed that the reaction force in the reaction force measurement step S2 has reached a prescribed value, the fixed dimension detection unit 11 is moved further in the aforementioned direction as illustrated in FIG. 2C. Next, after the reaction force measurement step S2 is performed to measure the reaction force after the movement by a fixed dimension, the detection unit 11 is returned to the initial position as illustrated in FIG. 2D. As a result, a reaction force difference can be obtained from two reaction forces of a reaction force when the prescribed value is reached and a reaction force when the fixed dimension detection unit 11 is moved further therefrom.

(3) Measurement Step S3

The measurement step S3 is a step of measuring the internal pressure of the tube F on the basis of the reaction force.

In the present embodiment, parameters related to physical properties (for example, hardness, inner and outer diameters, and the like) of the flexible tube F itself can be obtained before the start of the internal pressure measurement on the basis of the change amount (for example, a reaction force difference or the like) of the reaction force measured in the reaction force measurement step S2. Therefore, in the measurement step S3, the internal pressure of the tube F can be measured in a non-wetted manner in consideration of the difference in physical properties for each flexible tube F on the basis of the parameters. The physical properties of the flexible tube F affect a coefficient for converting a value measured as a force into a pressure value, and a difference between the measured pressure value and the true pressure value increases due to a deviation of the coefficient, which leads to a decrease in pressure measurement accuracy as a mechanism. On the other hand, in the present embodiment, the measurement error caused by the physical properties of the flexible tube F can be reduced, and as a result, the accuracy of the pressure measurement can be improved.

Furthermore, according to the present embodiment, since the internal pressure of the tube F can be measured in a non-wetted manner, it is not necessary to discard an expensive member such as a pressure gauge, which leads to cost reduction.

The method for measuring the internal pressure of the tube on the basis of the reaction force is not particularly limited, but specifically, for example, the internal pressure can be measured using a pressure correction coefficient described in "(4) Correction coefficient determination step S4" described later.

(4) Correction Coefficient Determination Step S4

In the present embodiment, the correction coefficient determination step S4 may be further performed as necessary.

The correction coefficient determination step S4 is a step of determining a pressure correction coefficient on the basis of the reaction force in the reaction force measurement step S2.

More specifically, for example, a reaction force difference in a case where the reaction force measurement step S2 is performed a plurality of times can be used. For example, as illustrated in FIGS. 2A, 2B, 2C, and 2D, it is possible to use a reaction force difference obtained from two reaction forces of a reaction force when the prescribed value is reached and a reaction force when the fixed dimension detection unit 11 is moved further therefrom.

Figure 3:
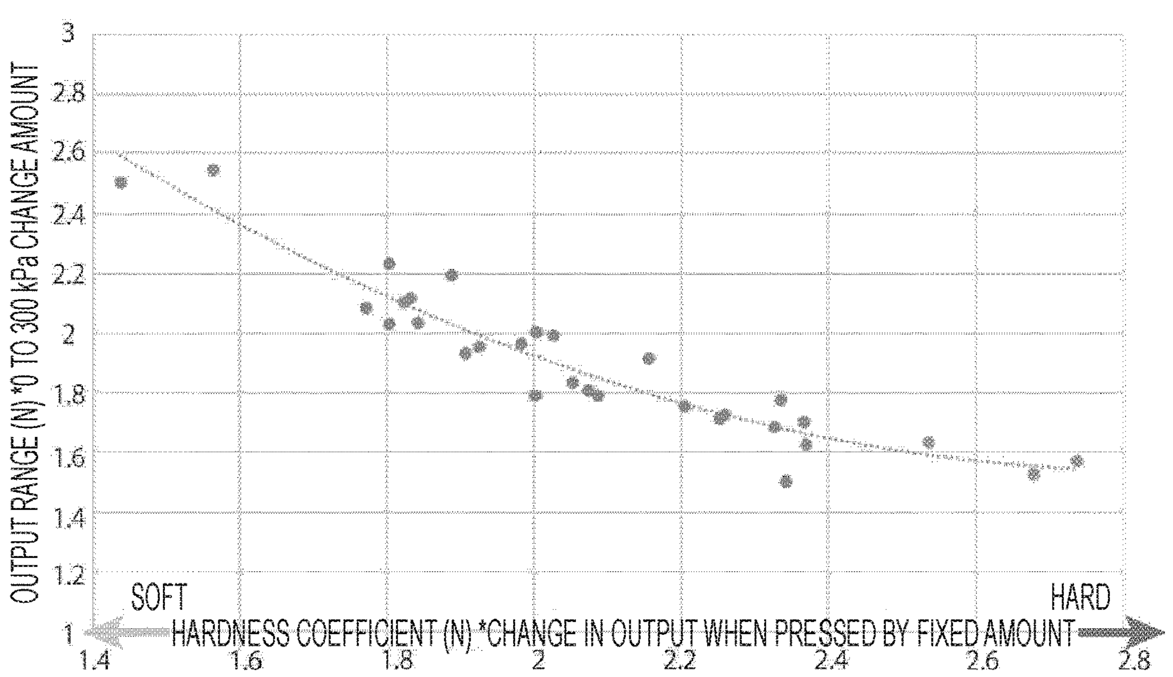
FIG. 3 is a diagram illustrating a relationship in which the horizontal axis represents a reaction force difference (h) and the vertical axis represents a pressure correction coefficient (A) at that time.

For example, as illustrated in FIG. 3, the reaction force difference is used when a relationship between the reaction force difference and an output when pressure is applied to the tube F is acquired and a pressure correction coefficient is determined on the basis of the relationship. As described above, since the flexible tube F has different physical properties depending on the material forming the tube F, the variation in the inner and outer diameters of the tube F, the outside air temperature at the time of measurement, and the like, it is possible to reduce the measurement error of the internal pressure due to the difference in physical properties by using the pressure correction coefficient.

Specifically, the pressure correction coefficient is obtained as follows, for example.

FIG. 3 illustrates a relationship in which the horizontal axis represents a difference (h) between two reaction forces acquired before and after the detection unit 11 is moved by a predetermined distance in the aforementioned direction, and the vertical axis represents a pressure correction coefficient (A) at that time. On the basis of the graph illustrated in FIG. 3, a pressure correction coefficient derived from the obtained reaction force difference is determined. This relational expression can be expressed by a quadratic function shown in the following expression (1).

[Math. 1]

$$A=f(h)=-ah^2+bh+c \quad (1)$$

A: Pressure correction coefficient h: Reaction force difference a, b, c: Experimentally determined constants Next, the internal pressure of the tube F is measured by substituting the output value from the detection unit 11 and the pressure correction coefficient determined in the procedure described above into the output-pressure conversion formula from the detection unit 11.

Specifically, the internal pressure of the tube F is obtained as follows, for example.

Figure 4:
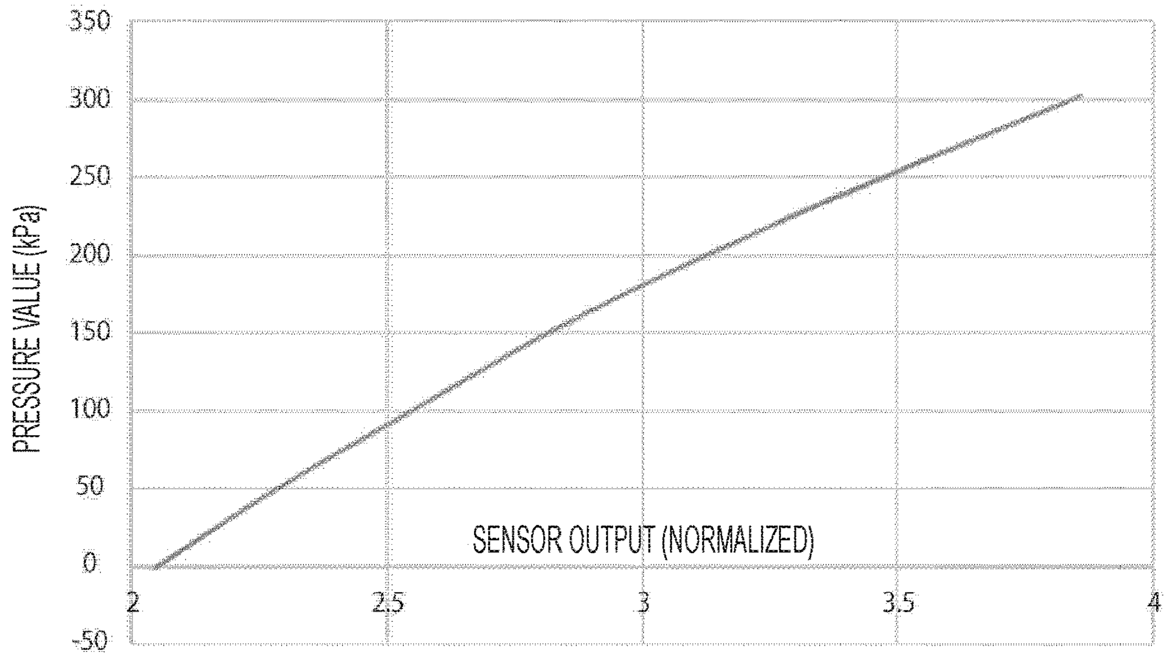
FIG. 4 is a diagram illustrating a relationship in which the horizontal axis represents a normalized value (v) and the vertical axis represents a standard pressure (P').

FIG. 4 illustrates a relationship in which the horizontal axis represents a value (v) obtained by normalizing the value output from the detection unit 11 and the vertical axis represents the standard pressure (P'). This relational expression can be expressed by a quadratic function shown in the following expression (2).

[Math. 2]

$$P'=g(v)=dv^2+ev+f \quad (2)$$

P': Standard pressure v: Value obtained by normalizing output value from detection unit 11 d, e, v: Experimentally determined constants

Here, since the correction using the pressure correction coefficient with respect to the standard pressure can be proportionally corrected at all points, the internal pressure (P) of the tube F can be obtained by the following expression (3).

[Math. 3]

$$P(v,h)=g(v)\times f(h) \quad (3)$$

P: Internal pressure of tube F v: Value obtained by normalizing output value from detection unit 11 h: Reaction force difference (5) Correction Step S5

In the present embodiment, the correction step S5 may be further performed as necessary.

The correction step S5 is a step of correcting the internal pressure in response to fluctuation in the external environment.

By performing the correction step S5, it is possible to reduce the measurement error of the internal pressure due to the change in the physical properties (for example, hardness, inner and outer diameters, and the like) of the flexible tube F due to fluctuation in the outside air environment during the pressure measurement.

Note that examples of the "outside air environment" mentioned herein include an outside air temperature, an outside air pressure, and the like, but in the present embodiment, the outside air temperature is preferable.

The method for correcting the internal pressure in response to fluctuation in the external environment is not particularly limited, but specifically, for example, the internal pressure can be corrected by a method described below.

Figure 5:
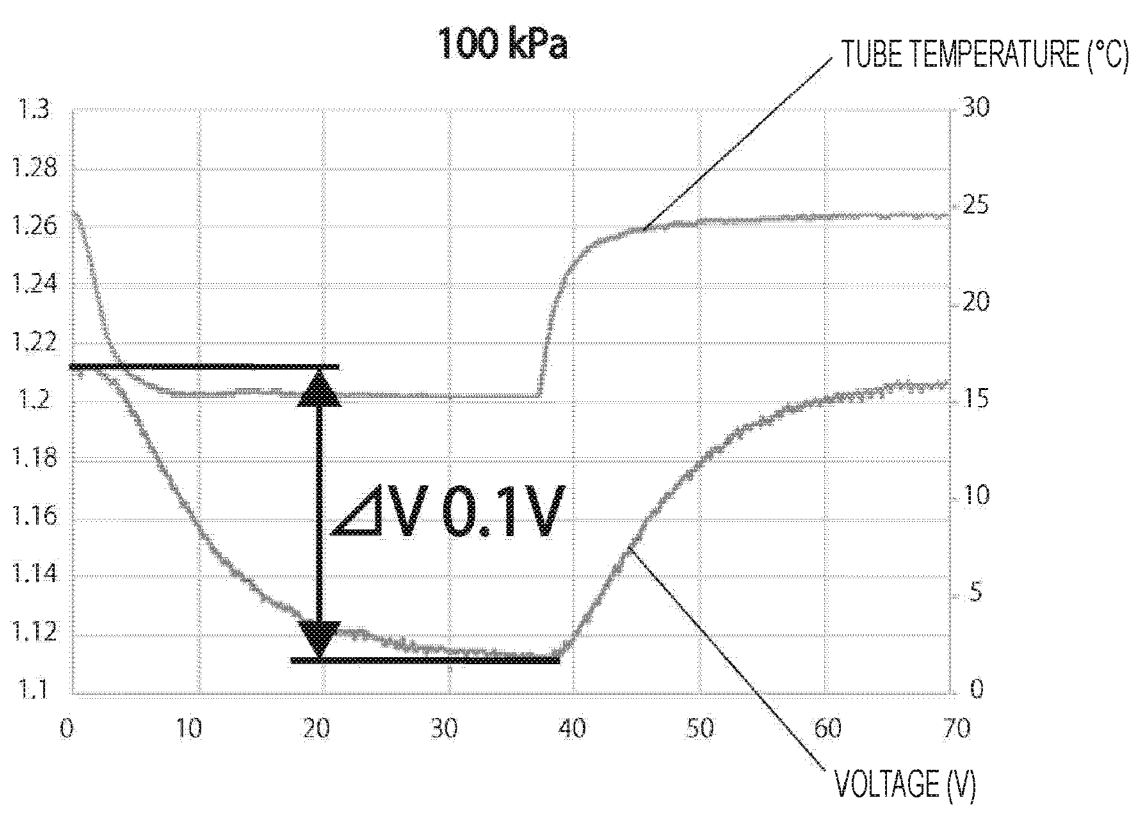
FIG. 5 is a diagram illustrating a relationship between a change in outside air temperature and an output by a detection unit.

FIG. 5 illustrates a relationship between a change in outside air temperature and an output by the detection unit 11.

With respect to fluctuation in the outside air temperature, the fluctuation in the internal pressure of the tube F can be predicted in a proportional relationship as illustrated in FIG. 5.

Furthermore, it is also possible to attach a temperature sensor, measure the outside air temperature by the sensor, and correct the change in the outside air temperature during the measurement by the following expressions (4) and (5) from the measured value (t).

[Math. 4]

$$P'=P(v,h)+P(t) \quad (4)$$

$$P(t)=k\times t \quad (5)$$

P': Standard pressure

P: Internal pressure of tube F v: Value obtained by normalizing output value from detection unit 11 h: Reaction force difference t: Measured value obtained from temperature sensor k: Experimentally determined constant (6) Determination Step S6

In the present embodiment, the determination step S6 may be performed as necessary.

The determination step S6 is a step of determining whether or not the internal pressure in the measurement step S3 exceeds a threshold.

By performing the determination step S3 during an operation such as liquid feeding, the user can easily find a trouble at the time of measurement.

Note that the "threshold" mentioned herein can be appropriately set by those skilled in the art. Specifically, for example, a case where the internal pressure exceeds or falls below a desired pressure value is assumed. Furthermore, in addition to these, a case where a state in which the internal pressure exceeds or falls below a desired pressure value continues for a predetermined time can also be assumed as the concept of the "threshold value".

Furthermore, in the present embodiment, since the measurement accuracy of the internal pressure in the measurement step S3 is high, there is an advantage that the threshold in the determination step S6 can also be set in more detail as compared with the conventional technology.

(7) Other Steps

In the present embodiment, other steps may be further performed as necessary.

Specifically, for example, as illustrated in FIG. 1, after the correction coefficient determination step S4 and before the measurement step S3, a return step S7 in which the detection unit 11 moved in the load measurement direction of the tube F returns to the initial position (the detection unit 11 moves in a direction opposite to the load measurement direction) may be performed.

2. Second Embodiment (Control Method)

Figure 6:
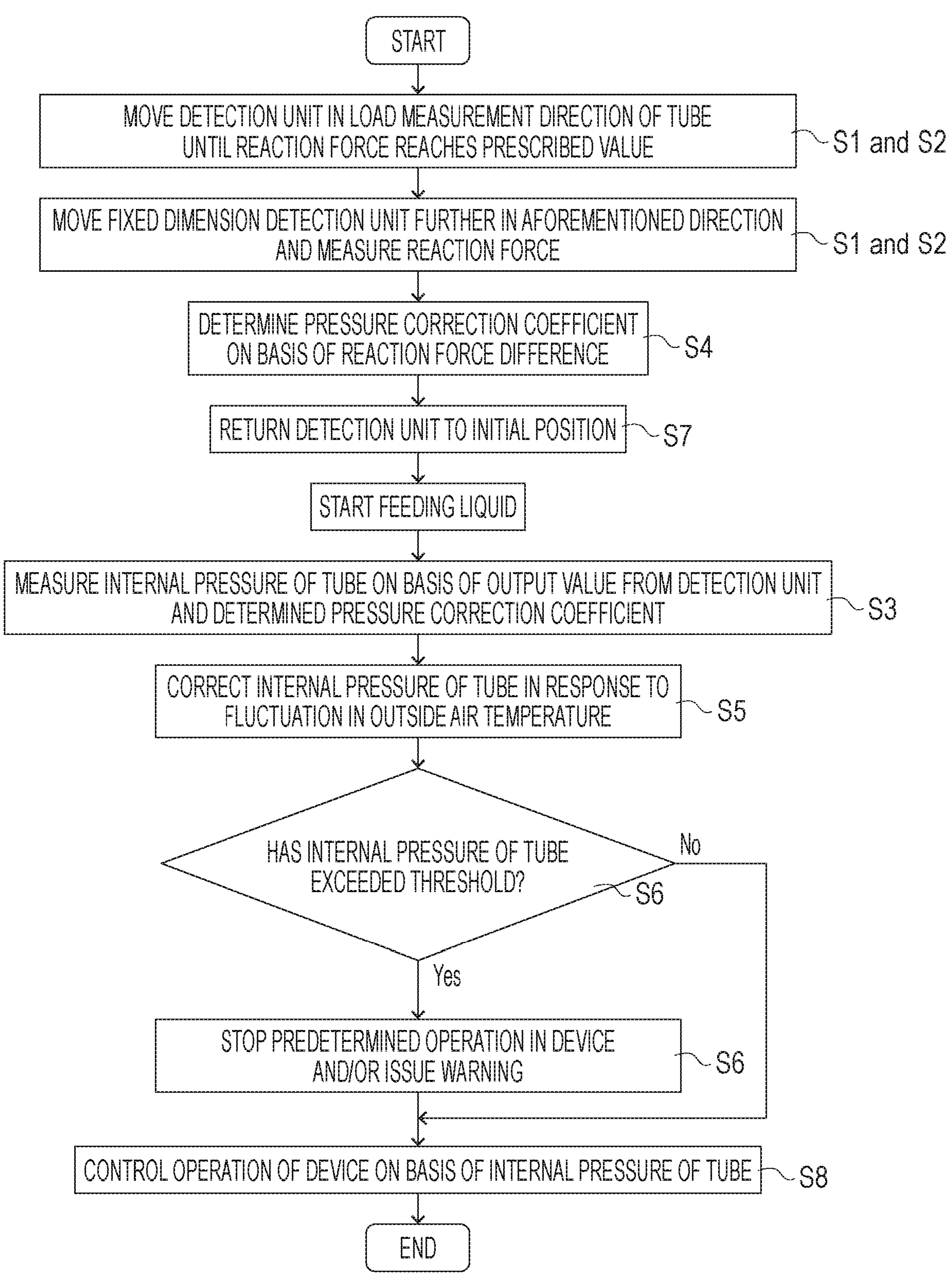
FIG. 6 is a diagram illustrating an example of a flow of a control method according to the present technology.

FIG. 6 is a diagram illustrating an example of a flow of a control method according to the present technology.

The control method according to the present embodiment performs at least a moving step S1, a reaction force measurement step S2, a measurement step S3, and a determination step S6, and in the determination step S6, in a case where the internal pressure in the measurement step S3 exceeds a threshold, a predetermined operation in the device is stopped and/or a warning is issued. Furthermore, other steps and the like may be performed as necessary. Hereinafter, each step will be described in detail.

Note that the moving step S1, the reaction force measurement step S2, and the measurement step S3 are similar to those described in "1. First embodiment" described above, and thus the description thereof is herein omitted.

(1) Modification of Determination Step S6

In the present embodiment, in addition to the determination step S6 described above, in a case where it is determined in the determination step S6 that the internal pressure in the measurement step S3 has exceeded the threshold value, the predetermined operation in the device is stopped and/or a warning is issued. As a result, a trouble in the device at the time of measurement can be found, and usability of a person skilled in the art who handles the device is improved.

Note that the "device" mentioned herein refers to, for example, a pressure measurement device 10, an analyzer 100, an analysis device, a particle extraction device, and the like described later, but is not limited thereto.

Examples of the predetermined operation in the device include, but are not limited to, feeding of various kinds of liquid (for example, a sample liquid containing particles, a sheath liquid, a buffer liquid, a gate liquid, and the like), priming operation of an analysis microchip or the like, rotation of a pump, movement of a detection unit or the like, irradiation of particles with light, detection of light, analysis of particles, sorting of particles, or a combination thereof.

More specifically, for example, in a case where it is determined that the desired pressure value has been exceeded, it is determined that various members such as a filter and an analysis microchip at the subsequent stage of the detection unit 11 are clogged, and the liquid feeding is stopped. Furthermore, for example, in a case where it is determined that the internal pressure has fallen below the desired pressure value, it is determined that there is a leak in the pipe, and the liquid feeding is stopped.

Examples of the method for issuing a warning include, but are not limited to, outputting an alert sound or displaying an alert.

More specifically, for example, in a case where it is determined that a state in which the internal pressure has exceeded the desired pressure value is continuing, an alert is displayed on a display unit or the like of the device to notify the user.

(2) Control Step S8

In the present embodiment, a control step S8 may be further performed as necessary.

The control step S8 is a step of controlling a predetermined operation in the device on the basis of the internal pressure in the measurement step S3.

The predetermined operation in the device is as described above. More specifically, for example, rotation of a pump in the device is feedback-controlled on the basis of the measured internal pressure. More specifically, in a priming operation of filling the inside of an analysis microchip or the like with various solutions, until the internal pressure reaches a fixed value, it is determined that the solution is not sufficiently filled, and the pump is rotated at a high speed. On the other hand, when the internal pressure exceeds the fixed value, it is determined that the priming operation is completed, and the rotation speed of the pump is lowered. As a result, it is possible to shorten the time required for the priming operation, and to avoid destruction, deterioration, and the like of various members such as the analysis microchip.

3. Third Embodiment (Pressure Measurement Device 10)

Figure 7A:
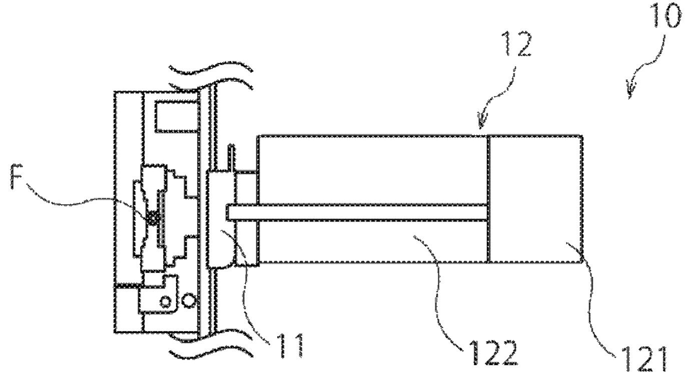
FIG. 7A is a conceptual diagram schematically illustrating an example of a pressure measurement device according to the present technology.
Figure 7B:
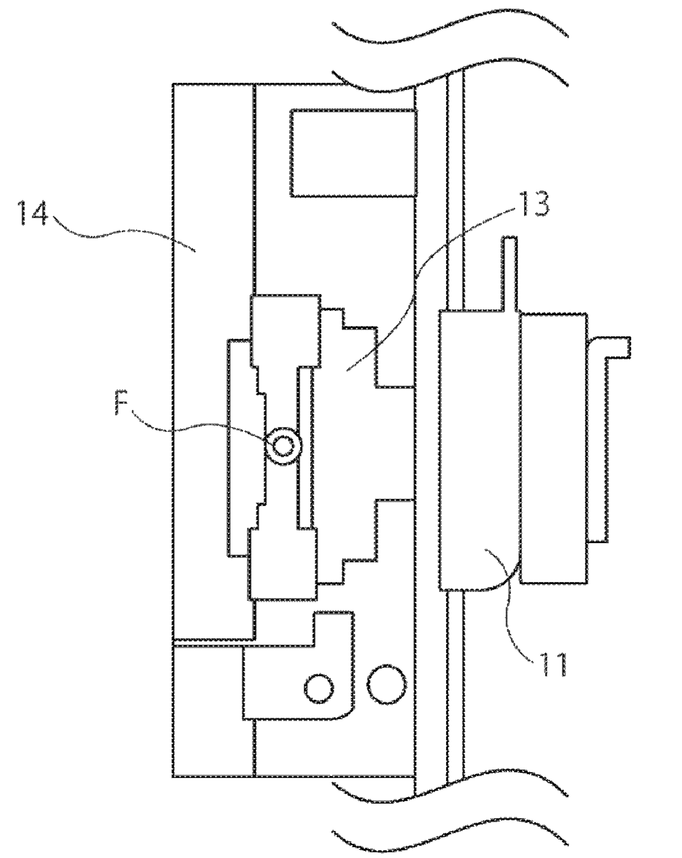
FIG. 7B is a partially enlarged view of FIG. 7A.

FIG. 7A is a conceptual diagram schematically illustrating an example of a pressure measurement device 10 according to the present technology, and B of FIG. 7B is a partially enlarged view of FIG. 7A.

The pressure measurement device 10 according to the present embodiment includes at least a detection unit 11 and a moving unit 12. The detection unit 10 measures a reaction force of the tube F, and measures an internal pressure of the tube F on the basis of the reaction force. Furthermore, other units may also be provided as needed. Hereinafter, each unit will be described in detail.

(1) Detection Unit 11

The detection unit 11 detects a force accompanying deformation of the flexible tube F.

Note that the detailed description of the detection unit 11, the method of measuring the internal pressure of the tube F on the basis of the reaction force of the tube F measured by the detection unit 11, and the like are similar to those described in "1. First embodiment" described above, and thus the description thereof is herein omitted.

(2) Moving Unit 12

The moving unit 12 moves the detection unit 11 by a predetermined distance in a load measurement direction of the tube F. For example, as illustrated in FIGS. 7A and 7B, the moving unit 12 can include a feed motor (power) 121 and a feed screw 122. Furthermore, according to the setting of those skilled in the art, the moving unit 12 can temporarily stop and then resume its movement. Furthermore, the detection unit 11 may move in a direction opposite to the load measurement direction, and for example, after the measurement of the reaction force by the detection unit 11, the detection unit 11 can be set to return to the initial position by the moving unit 12.

(3) Others

In the present embodiment, as illustrated in FIGS. 7A and 7B, a contact 13 that directly comes into contact with the tube F and an opening and closing lid 14 that opens and closes when the tube F is attached may be provided as necessary. Furthermore, the opening and closing lid 14 may function as a presser of the tube F after the tube F is attached. Furthermore, although not illustrated, various sensors such as a temperature sensor for measuring the outside air temperature and an atmospheric pressure sensor for measuring the outside air pressure may be provided.

4. Fourth Embodiment (Analyzer 100)

Figure 8:
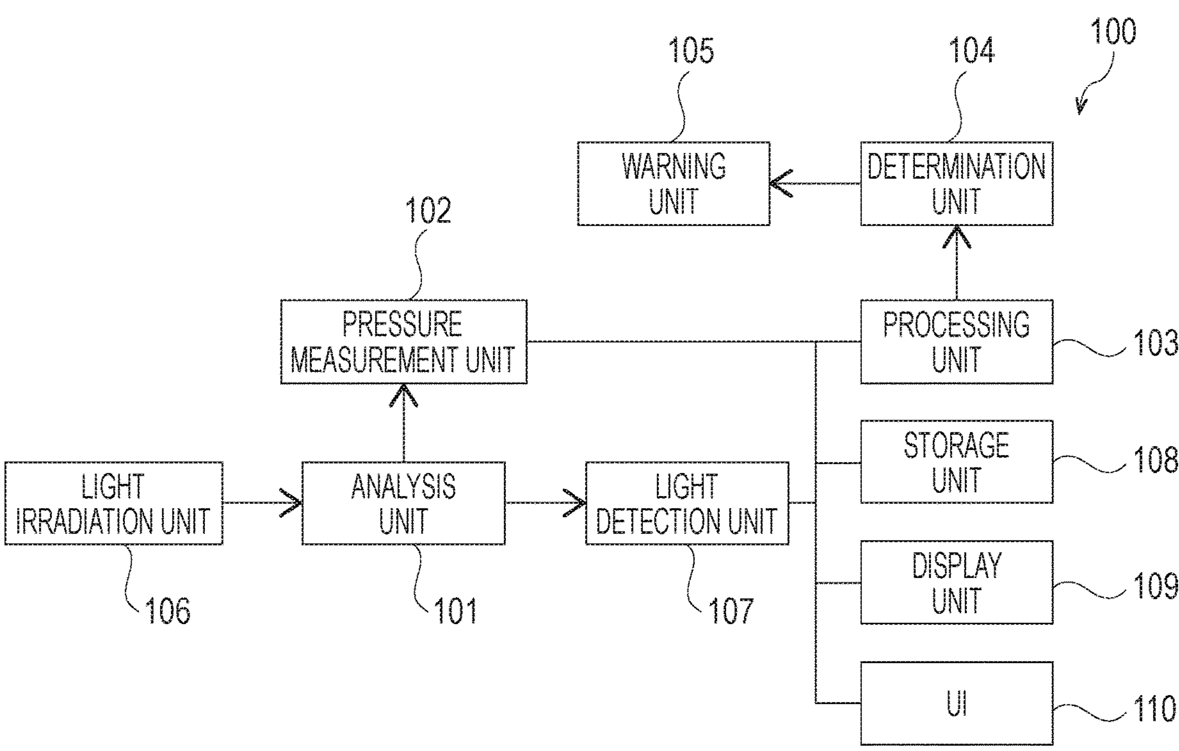
FIG. 8 is a conceptual diagram schematically illustrating an example of an analyzer according to the present technology.

FIG. 8 is a conceptual diagram schematically illustrating an example of an analyzer 100 according to the present technology.

The analyzer 100 according to the present embodiment includes at least an analysis unit 101 and a pressure measurement unit 102. Furthermore, a processing unit 103, a determination unit 104, a warning unit 105, a light irradiation unit 106, a light detection unit 107, a storage unit 108, a display unit 109, a user interface 110, and the like may be provided as necessary. Hereinafter, each unit will be described in detail.

(1) Analysis Unit 101

The analysis unit 101 includes a flexible tube F through which liquid flows.

The liquid may be, for example, any one or more selected from the group consisting of a sample liquid containing particles, a sheath liquid, and a buffer liquid.

The sample liquid containing particles is not particularly limited. Specific examples of the liquid include whole blood and a liquid such as a cell suspension containing only peripheral blood mononuclear cells and lymphocytes contained in whole blood.

Note that the "particle" mentioned herein may include not only bio-related microparticles such as cells, microorganisms, and ribosomes but also synthetic particles such as latex particles, gel particles, and industrial particles.

The bio-related microparticles may include chromosomes forming various cells, liposomes, mitochondria, organelles (cell organelles) and the like. The cells may include animal cells (for example, blood cells, or the like), plant cells, and the like. The microorganisms may include bacteria such as *Escherichia coli*, viruses such as tobacco mosaic virus, fungi such as yeast, and the like. Moreover, the bio-related microparticles may also include bio-related polymers such as nucleic acids, proteins, and composites of these, for example.

Furthermore, the industrial particles may be, for example, an organic or inorganic polymer material, metal, or the like. The organic polymer material may include polystyrene, styrene/divinylbenzene, polymethyl methacrylate, and the like. The inorganic polymer material may include glass, silica, a magnetic material, and the like. The metal may include gold colloid, aluminum, and the like. In general, shapes of the microparticles are generally spherical, but in the present technology, they may be non-spherical, and their size, mass and the like are also not particularly limited.

The analysis unit 101 is not particularly limited as long as it has the flexible tube F through which liquid flows, and may be, for example, an analysis kit 1011. Hereinafter, the analysis kit 1011 will be described in detail.

(1-1) Analysis Kit 1011

Figure 9:
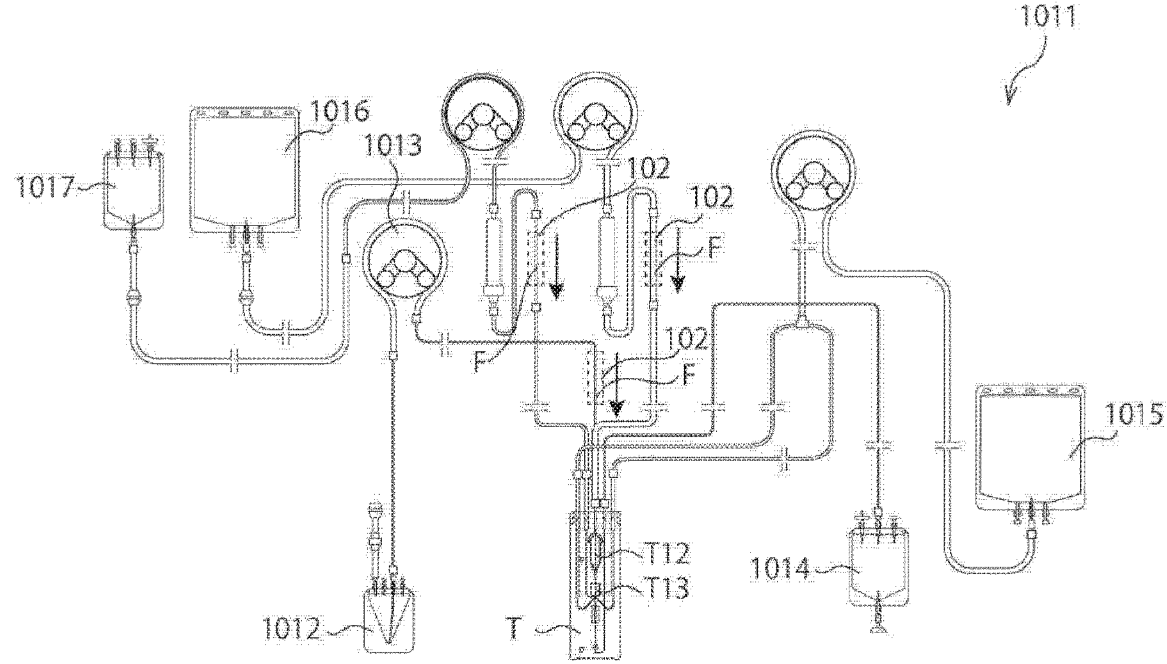
FIG. 9 is a conceptual diagram schematically illustrating an example of an analysis kit.

FIG. 9 is a conceptual diagram schematically illustrating an example of the analysis kit 1011.

The analysis kit 1011 includes at least a sample accommodation unit 1012, a sample flow path T12, and a detection region T13.

The sample accommodation unit 1012 accommodates a sample liquid containing particles to be sorted. The sample accommodation unit 1012 may include, for example, a cylindrical cylinder body with one end opened and a lid fitted to the cylinder body to close the opening. Furthermore, a plurality of opening valves for accommodating the sample liquid in the cylinder body may be formed in the lid, and a configuration of a check valve may be employed for each opening valve. Therefore, in a state in which the sample liquid is accommodated in the sample accommodation unit 1012 via the opening valves, the sample liquid does not go out of the sample accommodation unit 1012. Furthermore, the configuration of the opening valve prevents the sample liquid from coming into contact with an external atmosphere.

The sample accommodation unit 1012 may also include a substance that curbs aggregation of particles in the sample liquid. Thereby, aggregation of particles in the sample liquid can be curbed.

Examples of the substance include deoxyribonuclease (DNase), ethylenediaminetetraacetic acid (EDTA), poloxamer, and the like.

Furthermore, in this case, phosphate buffered saline (PBS) is preferable as the solution used for the sample liquid.

Note that, although not illustrated, a pre-sample accommodation unit can be provided upstream of the sample accommodation unit 1012 in the sorting kit 1011.

The sample accommodation unit 1012 has a flexible tube F through which liquid flows in a part thereof. The sample liquid is fed to a sample inlet T121 of a microchip T via the member. As a result, the sample liquid flows into a flow path of the microchip T, and a sheath flow is formed.

A broken line part in FIG. 9 is a part where the pressure measurement unit 102 can be provided. An arrow in FIG. 9 indicates a liquid feeding direction. Note that as illustrated in FIG. 9, a plurality of pressure measurement units 102 can be provided, but it is only required to provide one or more pressure measurement units in the present technology. By providing the pressure measurement unit 102 at these positions, it is possible to measure the internal pressure of the flexible tube F at the time of feeding any one or more kinds of liquid selected from the group consisting of a sample liquid, a sheath liquid, and a buffer liquid in a non-wetted manner, and it is possible to find clogging in a flow path structure, liquid leakage from a tubular member, failure of a priming operation, and the like on the basis of the result of the internal pressure. As a result, usability is improved, and destruction, deterioration, and the like of various members such as a microchip T for analysis described later can be avoided.

Note that in the present technology, even in a part other than the broken line part in FIG. 9, one or more pressure measurement units 102 can be provided at any point of the flexible tube F forming the analysis kit 1011.

The sample flow path T12 can be provided, for example, in the microchip T for analysis described later, but the present technology is not limited thereto. Specifically, for example, although not illustrated, a flow path or the like used in a conventional flow cytometer can also be used.

Figure 10:
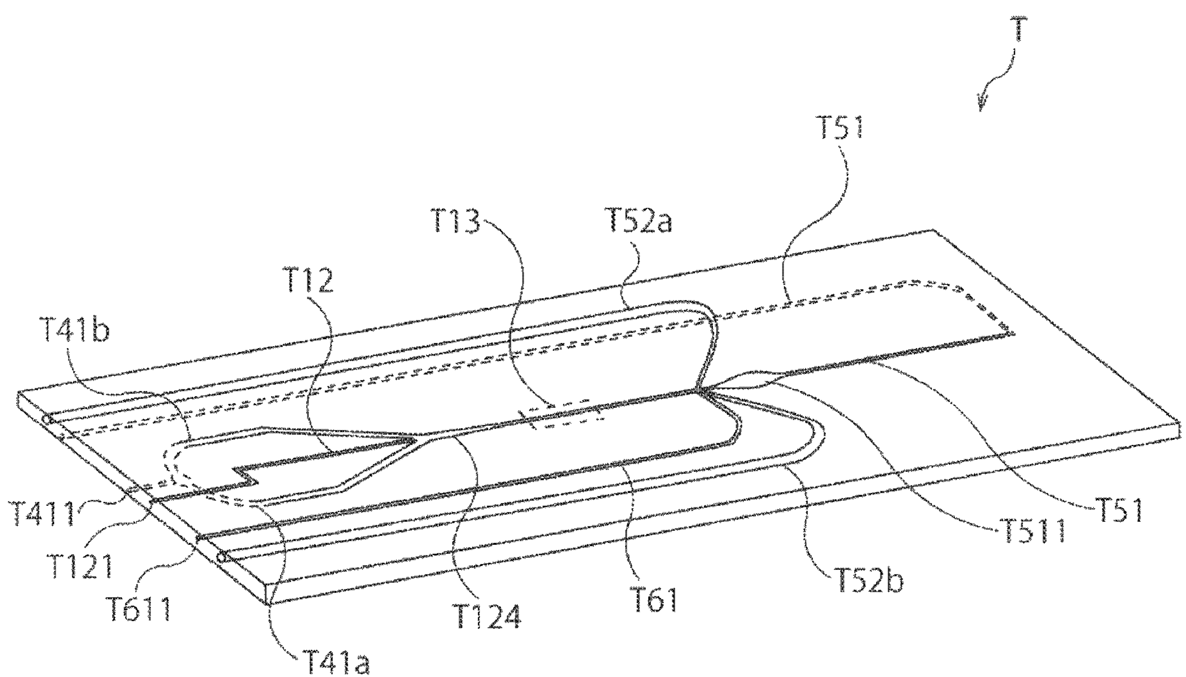
FIG. 10 is a conceptual diagram schematically illustrating an example of a microchip.

FIG. 10 is a conceptual diagram schematically illustrating an example of the microchip T.

The sample liquid containing particles is introduced from the sample inlet T121 into the sample flow path T12. Furthermore, a sheath liquid introduced from a sheath inlet T411 is divided into two sheath flow paths T41*a* and T41*b* and fed. The sample flow path T12 and the sheath flow paths T41*a* and T41*b* merge to form a main flow path T124. As a result, a sample liquid laminar flow fed through the sample flow path T12 and sheath liquid laminar flows fed through the sheath liquid paths T41*a* and T41*b* merge in the main flow path T124 to form a sheath flow in which the sample liquid laminar flow is sandwiched between the sheath liquid laminar flows.

The detection region T13 is a region in which excitation light is irradiated by a light irradiation unit 106 described later and fluorescence and scattered light are detected by a light detection unit 107 described later. The particles are fed to the detection region T13 in a state of being arranged in a line in the sheath flow formed in the main flow path T124, and are irradiated with the excitation light from the light irradiation unit 106. Then, optical characteristics of the particles can be analyzed by detecting the fluorescence and scattered light emitted from the particles irradiated with the excitation light by the light detection unit 107.

A tube pump unit 1013 may be formed by using an elastic material. Note that a roller for squeezing the flexible tube F may be provided in the sorting kit 1011 itself, but it is also possible to cause the sample liquid or the like in the flexible tube F to flow by installing the tube pump unit 1013 in a roller part provided on the side of the analyzer 100 according to the present embodiment.

(1-2) Case of Sorting Target Particles Using Analysis Kit 1011

In the present embodiment, it is also possible to sort particles (also referred to as "target particles") determined to satisfy predetermined optical characteristics using the analysis kit 1011 or the like. Hereinafter, a method for sorting target particles in the analysis kit 1011 will be described in detail.

The main flow path T124 communicates with three branch flow paths of a sorting flow path T51 and disposal flow paths T52*a* and T52*b* downstream of the detection region T13. Among them, the sorting flow path T51 is a flow path through which the target particles are taken in. In contrast, particles (also referred to as "non-target particles") determined not to satisfy the predetermined optical characteristics are not taken into the sorting flow path T51 and flow to any one of the two disposal flow paths T52*a* and T52*b*.

The target particles are taken into the sorting flow path T51 by generating a negative pressure in the sorting flow path T51 by a piezoelectric element such as a piezo element and sucking the sample liquid containing the target particles and the sheath liquid into the sorting flow path T51 using the negative pressure. The piezoelectric element is arranged in contact with a surface of the microchip T, and is arranged at a position corresponding to the sorting flow path T51. More specifically, the piezoelectric element is arranged at a position corresponding to a pressure chamber T511 provided as a region in which an inner space is expanded in the sorting flow path T51.

As illustrated in FIG. 10, the inner space of the pressure chamber T511 is expanded in a planar direction (width direction of the sorting flow path T51) and also expanded in a cross-sectional direction (height direction of the sorting flow path T51). That is, the sorting flow path T51 is expanded in the width direction and the height direction in the pressure chamber T511. In other words, the sorting flow path T51 is formed in the pressure chamber T511 so that a cross section perpendicular to a flow direction of the sample liquid and the sheath liquid becomes large.

The piezoelectric element generates an elastic force with a change in an applied voltage, and causes a pressure change in the sorting flow path T51 via a surface (contact surface) of the microchip T. When a flow occurs in the sorting flow path T51 along with the pressure change in the sorting flow path T51, a volume in the sorting flow path T51 changes at the same time. The volume in the sorting flow path T51 changes until reaching a volume defined by a displacement amount of the piezoelectric element corresponding to the applied voltage. More specifically, the piezoelectric element keeps the volume of the pressure chamber T511 small by pressing a displacement plate forming the pressure chamber T511 in a state of being stretched by applying a voltage. Then, when the applied voltage drops, the piezoelectric element generates a force in a direction of contraction, and weakens the pressure on the displacement plate to generate a negative pressure in the pressure chamber T511.

The microchip T can be formed by bonding substrate layers on which the sample flow path T12, the sorting flow path T51, and the like are formed. The sample flow path T12, the sorting flow path T51, and the like can be formed on the substrate layer by injection molding of a thermoplastic resin using a mold, for example. For thermoplastic resin, conventionally known materials such as polycarbonate, polymethyl methacrylate resin (PMMA), cyclic polyolefin, polyethylene, polystyrene, polypropylene, or polydimethylsiloxane (PDMS) can be used, for example. Note that the number of substrate layers forming the microchip T is not particularly limited, and the microchip T may include, for example, two or more layers.

Furthermore, the microchip T may further include a gate inlet T611 into which a gate liquid is introduced and a gate flow path T61 in which the gate liquid introduced from the gate inlet T611 flows. The gate flow path T61 may be provided, for example, so as to be connected to one or more of the sorting flow path T51 from the three branch flow paths of the sorting flow path T51 and the disposal flow paths T52*a* and T52*b* to the front of the pressure chamber T511, or may be provided, for example, so as to perpendicularly intersect therewith. Note that the "gate liquid" mentioned herein is a liquid allowed to flow to the gate flow path T61 and this serves as a main solvent of the target particles or the like, so that various liquids may be selected according to the application. Specific examples of the gate liquid include a liquid medium used as a particle-containing liquid, a sheath liquid, and, in a case where the particle is a protein, a buffer liquid in which pH or the like is adjusted.

In following paragraphs, a flow formed by the gate liquid is referred to as a "gate flow".

An upstream side of the gate flow path T61 may be independently introduced from a gate flow inlet T611 and allowed to flow at an appropriate flow rate. Since a flow rate of the liquid introduced into the gate flow path T61 is smaller than a flow rate of the liquid introduced into the sheath flow paths T41*a* and T41*b*, it is useful in a case of using an expensive liquid such as a cell culture solution, a cell preservative solution, or a differentiation inducing solution only for the gate flow path T61.

Furthermore, the gate flow may be generated so as to be branched from the sheath liquid flow. For example, the gate flow can be generated by connecting the sheath flow paths T41*a* and T41*b* after the sheath inlet T411 to an upstream end of the gate flow path T61 so that the sheath liquid flow branches and flows into the gate flow path T61 as well. At that time, it is necessary to appropriately design a flow path resistance of the gate flow path T61 so that the gate flow rate becomes the appropriate flow rate.

At a site where the gate flow path T61 and the sorting flow path T51 intersect with each other, together with a gate flow directed straight in the gate flow path T61, gate flows directed toward the detection region T13 side and the pressure chamber T511 side are also generated. The latter gate flow can prevent non-target particles from entering the pressure chamber T511 side of the sorting flow path T51. The gate flow flowing through the gate flow path T61 flows out to the sorting flow path T51 and branches into the gate flow toward the detection region T13 side and the pressure chamber T511 side of the sorting flow path T51. The former gate flow can prevent non-target particles from entering the pressure chamber T511 side of the sorting flow path T51.

The analysis kit 1011 may include a target particle storage unit 1014 as necessary.

The target particle storage unit 1014 accommodates the sorted target particles. The target particle storage unit 1014 is formed into, for example, a bag shape in which the target particles are accommodated, and is provided with an opening valve connected to the sorting flow path T51 of the microchip T. The opening valve employs a configuration of a so-called check valve, and in a state in which the target particles are accommodated in the target particle storage unit 1014 via the opening valve, the target particles do not go out of the target particle storage unit 1014. Furthermore, the configuration of the opening valve prevents the target particles from coming into contact with the external atmosphere.

The analysis kit 1011 may be provided with a disposal unit 1015 as necessary.

In the analysis kit 1011, when only the target particles are sorted from the sample liquid in the microchip T, it is necessary to exclude the non-target particles. In addition, since a sheath flow is formed in the microchip T to sort target particles, it is necessary to eliminate a sample liquid containing non-target particles. Therefore, a liquid (waste liquid) containing non-target particles is collected in the disposal unit 1015.

The analysis kit 1011 may be provided with a sheath liquid accommodation unit 1016 as necessary.

In the sorting kit 1011, the sheath flow is formed, and target particles are sorted from the sample liquid in the sample flow path T12. Therefore, the sheath liquid accommodation unit 1016 accommodates a sheath liquid.

The sheath liquid accommodation unit 1016 includes a flexible tube F through which the sheath liquid flows in a part thereof, and feeds the sheath liquid to the sheath inlet T411 of the microchip T via the member. As a result, the sheath liquid flows into the flow path of the microchip T, and a sheath flow is formed.

The configuration of the sheath liquid accommodation unit 1016 is not particularly limited, and a conventionally known configuration may be employed. Furthermore, the configuration for discharging the sheath liquid from the sheath liquid accommodation unit 1016 is also not particularly limited, and for example, a drive source such as an actuator may be used.

The sorting kit 1011 may be provided with a gate liquid accommodation unit 1017 as necessary. The gate liquid is accommodated in the gate liquid accommodation unit 1017. Note that the "gate liquid" is similar to that described above, and thus the description thereof is herein omitted.

The gate liquid accommodation unit 1017 includes a flexible tube F through which the gate liquid flows in a part thereof, and feeds the gate liquid to a gate liquid inlet T611 of the microchip T via the member. As a result, the gate liquid flows into the flow path of the microchip T, and the target particles are sorted.

The configuration of the gate liquid accommodation unit 1017 is not particularly limited, and a conventionally known configuration may be employed. Furthermore, the configuration for discharging the gate liquid from the gate liquid accommodation unit 1017 is also not particularly limited, and for example, a drive source such as an actuator may be used.

Although not illustrated, in the sorting kit 1011, a filter or the like is provided in the middle of each member of the sorting kit 1011, so that mixing of foreign substances, reduction of dead volume, and the like can be achieved.

(1-3) Others

Some or all of the units of the analysis kit 1011 can be hermetically connected. Therefore, analysis of the particles, sorting of the target particles, and storage of the target particles, for example, may be executed in a sealed space, so that accuracy of the analysis and sorting may be improved. Furthermore, it is possible to prevent contamination of the analysis kit 1011 itself by mist containing particles and/or mixture of other substances into the target particles. As a result, the analysis kit 1011 can also be applied to clinical applications such as immune cell therapy.

Furthermore, the analysis kit 1011 itself can be made disposable, and risk of contamination between samples and the like can be avoided to improve usability.

Furthermore, a plurality of the units of the analysis kit 1011 can be provided. For example, although not illustrated, by further providing the microchip T downstream of the target particle storage unit 1014, the sorted target particles can be sorted more finely.

Note that the analysis kit 1011 is also assumed to be distributed as a cartridge, a unit, a device, a kit, an instrument, or the like for a closed cell sorter.

(2) Pressure Measurement Unit 102

The pressure measurement unit 102 includes a detection unit 11 and a moving unit 12.

The configuration of the pressure measurement unit 102, the specific processing performed in the pressure measurement unit 102, and the like are similar to those described in "3. Third embodiment" described above, and thus the description thereof is herein omitted.

(3) Processing Unit 103

In the present embodiment, a processing unit 103 may be provided as necessary.

The processing unit 103 determines a pressure correction coefficient on the basis of the reaction force.

Since the method of determining the pressure correction coefficient is similar to that described in "(4) Correction coefficient determination step S4" described above, the description thereof is herein omitted.

Furthermore, an electric signal converted by the light detection unit 107 described later may be input to the processing unit 103. The processing unit 103 determines optical characteristics of particles contained in the sample liquid on the basis of an input electric signal.

Moreover, the processing unit 103 may be provided with a gating circuit for calculating a threshold for sorting target particles from the sample liquid, a threshold for determining whether or not target particles of a requested number or more are sorted, and the like. As a result, in a case where a threshold for sorting target particles from the sample liquid is calculated, the threshold is converted into an electric signal for sorting, and the signal is output to the piezoelectric element provided on the microchip T.

Note that the configuration of the processing unit 103 is not particularly limited, and a conventionally known configuration may be employed. Moreover, the processing performed by a gating circuit of the processing unit 103 is also not particularly limited, and a conventionally known method may be adopted.

(4) Determination Unit 104

In the present embodiment, a determination unit 104 may be provided as necessary.

The determination unit 104 determines whether or not the internal pressure exceeds a threshold.

Since specific processing and the like performed in the determination unit 104 are similar to those described in "(6) Determination step S6 of 1. First embodiment" and "(1) Modification of determination step S6 of 2. Second embodiment" described above, the description thereof is herein omitted.

Note that in the present technology, the processing unit 103 and the determination unit 104 described above do not necessarily need to be separated from each other as in the present embodiment, and the processing unit 103 may perform processing of determining whether or not the internal pressure exceeds a threshold.

(5) Warning Unit 105

In the present embodiment, a warning unit 105 may be provided as necessary.

The warning unit 105 issues a warning in a case where the internal pressure exceeds a threshold in the determination unit 104.

Since specific processing and the like performed in the warning unit are similar to those described in "(1) Modification of determination step S6 of 2. Second embodiment" described above, the description thereof is herein omitted.

Note that in the present technology, the warning unit 105 and a display unit 109 described later do not necessarily need to be separated from each other as in the present embodiment, and processing of issuing a warning may be performed in a case where the internal pressure exceeds a threshold in the display unit 109.

(6) Light Irradiation Unit 106

In the present embodiment, a light irradiation unit 106 may be provided as necessary.

The light irradiation unit 106 irradiates particles to be analyzed or sorted with light. Specifically, the light irradiation unit 106 irradiates particles flowing through the detection region T13 with light (excitation light).

The light irradiation unit 106 includes, for example, a light source that emits the excitation light, an objective lens that condenses the excitation light on the sample liquid that flows through the main flow path T124, and the like. The light source may be appropriately selected from a laser diode, an SHG laser, a solid-state laser, a gas laser, a high-luminance LED, and the like according to the purpose of analysis to be used. Furthermore, the light irradiation unit 106 may include optical elements other than the light source and the object lens as necessary.

(7) Light Detection Unit 107

In the present embodiment, a light detection unit 107 may be provided as necessary.

The light detection unit 107 detects light emitted from particles irradiated with excitation light. Specifically, the light detection unit 107 detects the fluorescence and scattered light emitted from the particles and converts the fluorescence and scattered light into an electric signal. Then, the light detection unit 107 outputs the electric signal to the processing unit 103 described above.

The configuration of the light detection unit 107 is not particularly limited, and a conventionally known configuration may be employed. Furthermore, the method of conversion into an electric signal is also not particularly limited.

(8) Storage Unit 108

In the present embodiment, a storage unit 108 may be provided as necessary.

The storage unit 108 stores various types of data. Examples of the various types of data include results of internal pressure measured by the pressure measurement unit 102, optical information of particles detected by the light detection unit 107, a processing record in the processing unit 103, and the like, and all items related to analysis can be stored.

Furthermore, in the present technology, although not illustrated, the storage unit 108 can also be provided in a cloud environment. As a result, it is also possible for those skilled in the art to share various types of information recorded in the storage unit 108 on the cloud via a network.

Note that in the present technology, various types of data can be stored using an external storage device or the like connected via the Internet instead of the storage unit 108.

(9) Display Unit 109

In the present embodiment, a display unit 109 may be provided as necessary.

The display unit 109 displays various types of data. Examples of the various types of data include results of internal pressure measured by the pressure measurement unit 102, optical information of particles detected by the light detection unit 107, a processing record in the processing unit 103, and the like, and all items related to analysis can be displayed.

Note that in the present technology, various types of data can be displayed using an external display device or the like instead of the display unit 109. Specifically, for example, a display, a printer, a portable information terminal, or the like connected via the Internet can be used.

(10) User Interface 110

In the present embodiment, a user interface 110 may be provided as necessary.

The user can access each unit of the analyzer 100 according to the present embodiment via the user interface 110 and operate each unit.

Note that in the present technology, it is also possible to operate each unit using an external operation device or the like instead of the user interface 110. Specifically, for example, a mouse, a keyboard, a portable information terminal, or the like connected via the Internet can be used.

Note that the present technology can also employ the following configurations.

[1]

A pressure measurement method at least including:

a moving step of moving a detection unit that detects a force accompanying deformation of a flexible tube by a predetermined distance in a load measurement direction of the tube;

a reaction force measurement step of measuring a reaction force of the tube by the detection unit; and a measurement step of measuring an internal pressure of the tube on the basis of the reaction force in the reaction force measurement step.

[2]

The pressure measurement method according to [1], in which the moving step and the reaction force measurement step are performed simultaneously.

[3]

The pressure measurement method according to [2], in which in the moving step, the detection unit is moved in the direction until the reaction force in the reaction force measurement step reaches a prescribed value.

[4]

The pressure measurement method according to [3], in which in the moving step, the detection unit is moved in the direction until the reaction force in the reaction force measurement step reaches a prescribed value, and then the detection unit is further moved by a predetermined distance in the direction.

[5]

The pressure measurement method according to any one of [1] to [4] further including a correction coefficient determination step of determining a pressure correction coefficient on the basis of the reaction force in the reaction force measurement step.

[6]

The pressure measurement method according to any one of [1] to [5] further including a correction step of correcting the internal pressure in response to fluctuation in an external environment.

[7]

The pressure measurement method according to any one of [1] to [6] further including a determination step of determining whether or not the internal pressure in the measurement step exceeds a threshold.

[8]

A device control method at least including:

a moving step of moving a detection unit that detects a force accompanying deformation of a flexible tube by a predetermined distance in a load measurement direction of the tube;

a reaction force measurement step of measuring a reaction force of the tube by the detection unit;

a measurement step of measuring an internal pressure of the tube on the basis of a reaction force in the reaction force measurement step; and a determination step of determining whether or not the internal pressure in the measurement step exceeds a threshold, in which in the determination step, in a case where the internal pressure in the measurement step exceeds the threshold, a predetermined operation in the device is stopped and/or a warning is issued.

[9]

The control method according to [9] further including a control step of controlling a predetermined operation in the device on the basis of the internal pressure in the measurement step.

[10]

A pressure measurement device at least including a detection unit that detects a force accompanying deformation of a flexible tube, and a moving unit that moves the detection unit by a predetermined distance in a load measurement direction of the tube, in which the detection unit measures a reaction force of the tube, and measures an internal pressure of the tube on the basis of the reaction force.

[11]

An analyzer at least including an analysis unit that has a flexible tube through which a liquid flows, and a pressure measurement unit that includes a detection unit for detecting a force accompanying deformation of the flexible tube, and a moving unit for moving the detection unit by a predetermined distance in a load measurement direction of the tube, in which the pressure measurement unit measures a reaction force of the tube by the detection unit, and measures an internal pressure of the tube on the basis of the reaction force.

[12]

The analyzer according to [11] further including a processing unit that determines a pressure correction coefficient on the basis of the reaction force.

[13]

The analyzer according to [11] or [12] further including a determination unit that determines whether or not the internal pressure exceeds a threshold.

[14]

The analyzer according to [13] further including a warning unit that issues a warning in a case where the internal pressure exceeds a threshold in the determination unit.

[15]

The analyzer according to any one of [11] to [14], in which the liquid is any one or more selected from the group consisting of a sample liquid containing particles, a sheath liquid, and a buffer liquid.

[16]

The analyzer according to [15] further including a light irradiation unit that irradiates the particles with light, and a light detection unit that detects light emitted from the particles.

REFERENCE SIGNS LIST

10 Pressure measurement device
11 Detection unit
12 Moving unit
13 Contact
14 Opening and closing lid
100 Analyzer
101 Analysis unit
1011 Analysis kit
1012 Sample accommodation unit
1013 Tube pump unit
1014 Target particle storage unit
1015 Disposal unit
1016 Sheath liquid accommodation unit
1017 Gate liquid accommodation unit
102 Pressure measurement unit
103 Processing unit
104 Determination unit
105 Warning unit
106 Light irradiation unit
107 Light detection unit
108 Storage unit
109 Display unit
110 User interface
F Flexible tube
T Microchip

The invention claimed is:

1. A pressure measurement method, comprising:

moving a detection unit by a first distance in a load measurement direction of a flexible tube, wherein the detection unit detects a force accompanying deformation of the flexible tube;

measuring, by the detection unit, a reaction force of the flexible tube;

determining a pressure correction coefficient based on the measured reaction force of the flexible tube; and measuring an internal pressure of the flexible tube based on the determined pressure correction coefficient and the reaction force.

2. The pressure measurement method according to claim 1, wherein the movement of the detection unit and the measurement of the reaction force are performed simultaneously.

3. The pressure measurement method according to claim 2, wherein the detection unit is moved in the load measurement direction until the reaction force reaches a specific value.

4. The pressure measurement method according to claim 3, further comprising moving, after the reaction force has reached the specific value, the detection unit by a second distance in the load measurement direction of the flexible tube.

5. The pressure measurement method according to claim 1, further comprising correcting the internal pressure based on fluctuation in an external environment.

6. A device control method of a device, comprising:

moving a detection unit by a specific distance in a load measurement direction of a flexible tube, wherein the detection unit detects a force accompanying deformation of the flexible tube;

measuring, by the detection unit, a reaction force of the flexible tube;

determining a pressure correction coefficient based on the measured reaction force of the flexible tube;

measuring an internal pressure of the flexible tube based on the determined pressure correction coefficient and the reaction force; and determining whether the internal pressure of the flexible tube exceeds a specific threshold value; and at least one of stopping a specific operation in the device or issuing a warning associated with the device, based on the internal pressure that has exceeded the specific threshold value.

7. The device control method according to claim 6, further comprising controlling the specific operation in the device based on the internal pressure of the flexible tube.

8. A pressure measurement device, comprising:

a detection unit configured to detect a force accompanying deformation of a flexible tube, and a moving unit configured to move the detection unit by a specific distance in a load measurement direction of the flexible tube, wherein the detection unit is further configured to:

measure a reaction force of the flexible tube, wherein the pressure measurement device is configured to determine a pressure correction coefficient based on the measured reaction force of the flexible tube; and measure an internal pressure of the flexible tube based on the determined pressure correction coefficient and the reaction force.

9. An analyzer, comprising:

an analysis unit that includes a flexible tube through which a liquid flows;

a pressure measurement unit that includes a detection unit, wherein the detection unit is configured to detect a force accompanying deformation of the flexible tube;

a moving unit configured to move the detection unit by a specific distance in a load measurement direction of the flexible tube, wherein the pressure measurement unit is configured to:

measure a reaction force of the flexible tube; and measure an internal pressure of the flexible tube based on the reaction force; and a processing unit configured to determine a pressure correction coefficient based on the reaction force.

10. The analyzer according to claim 9, further comprising a warning unit configured to issue a warning in a case where the internal pressure exceeds a specific threshold value.

11. The analyzer according to claim 9, wherein the liquid is at least one selected from the group consisting of a sample liquid containing particles, a sheath liquid, and a buffer liquid.

12. The analyzer according to claim 11, further comprising:

a light irradiation unit configured to irradiate the particles with light, and a light detection unit configured to detect the light emitted from the particles.

* * * * *